US012229840B2

(12) United States Patent
Fan et al.

(10) Patent No.: US 12,229,840 B2
(45) Date of Patent: Feb. 18, 2025

(54) METHOD FOR RECOMMENDING RICE PANICLE FERTILIZER NITROGEN BASED ON CROP MODEL AND REMOTE SENSING COUPLING

(71) Applicant: China Agricultural University, Beijing (CN)

(72) Inventors: Mingsheng Fan, Beijing (CN); Yanan Hao, Beijing (CN); Ying Huang, Beijing (CN)

(73) Assignee: CHINA AGRICULTURAL UNIVERSITY, Beijing (CN)

( * ) Notice: Subject to any disclaimer, the term of this patent is extended or adjusted under 35 U.S.C. 154(b) by 0 days.

(21) Appl. No.: 18/582,259

(22) Filed: Feb. 20, 2024

(65) Prior Publication Data
US 2024/0386510 A1  Nov. 21, 2024

(30) Foreign Application Priority Data
May 18, 2023 (CN) .......................... 202310561959.1

(51) Int. Cl.
 G06F 30/20  (2020.01)
 A01C 21/00  (2006.01)
 G06Q 50/02  (2012.01)

(52) U.S. Cl.
 CPC ........... *G06Q 50/02* (2013.01); *A01C 21/007* (2013.01)

(58) Field of Classification Search
 CPC .............................. G06Q 50/02; A01C 21/007
 See application file for complete search history.

(56) References Cited

U.S. PATENT DOCUMENTS

| | | | |
|---|---|---|---|
| 6,442,486 B1 * | 8/2002 | Satake ................. | G06Q 10/04 |
| | | | 250/226 |
| 2020/0141877 A1 * | 5/2020 | Zhu ....................... | A01G 22/22 |
| 2022/0167571 A1 * | 6/2022 | Zhang ................... | A01C 21/00 |

* cited by examiner

*Primary Examiner* — Nithya J. Moll
(74) *Attorney, Agent, or Firm* — MUNCY, GEISSLER, OLDS & LOWE, P.C.

(57) ABSTRACT

A rice nitrogen of panicle fertilizer accurate recommendation method based on crop model and remote sensing coupling includes the following steps: S1. constructing a basic database; S2. agricultural parameter inversion modeling based on the remote sensing vegetation index; S3. rice nitrogen nutrition diagnosis based on the nitrogen nutrition index NNI; and S4. accurately recommending panicle fertilizer nitrogen based on a crop growth model and remote sensing nitrogen nutrition diagnosis. According to the method, the rice growth trend and nitrogen nutrition estimation in the key growth period is achieved through a remote sensing inversion technology, a multi-source remote sensing inversion spatial dataset based on the rice growth trend is taken as a combination point coupling crop growth model to simulate the rice yield in real time, the rice nitrogen nutrition condition and the nitrogen demand are further combined, and the plots-level nitrogen of panicle fertilizer accurate recommendation is finally achieved.

6 Claims, 5 Drawing Sheets

METHOD FOR RECOMMENDING RICE PANICLE FERTILIZER NITROGEN BASED ON CROP MODEL AND REMOTE SENSING COUPLING

TECHNICAL FIELD

The invention belongs to the technical field of rice panicle fertilizer estimation, and relates to an accurate recommendation method for rice panicle fertilizer nitrogen based on the crop models and remote sensing coupling.

BACKGROUND

Rice is one of most important food crops in China. Two-thirds of the population in China depend on rice as their staple food. Rice production is of great significance to ensuring food security in China. Nitrogen is the most important limiting factor in rice production, but problems such as unreasonable nitrogen fertilizer management and serious nitrogen fertilizer losses in current rice production in China are still prominent. Therefore, it is crucial to achieve precise nitrogen management in rice production.

In rice nitrogen management, the application of panicle fertilizer is an important measure. It has an extremely important impact on rice growth traits, population quality and yield. With the application of rice side deep fertilization technology, the mode of rice nitrogen fertilizer application has developed towards simplicity. From the past 3-4 fertilization modes of applying basal fertilizer, tiller fertilizer, panicle fertilizer and/or granular fertilizer, it has gradually changed to a two-time fertilization mode of application of basal fertilizer using side deep fertilization technology and application of panicle fertilizer during the panicle initiation stage; precise application of panicle fertilizer is an important guarantee for high rice yield and efficient nitrogen utilization.

The traditional recommendation method for panicle fertilizer is either to determine the total nitrogen application amount based on the target yield, then directly apply basal tiller fertilizer and panicle fertilizer at a certain fixed ratio according to the rice nutrient absorption rules; or nutritional diagnosis of rice can be conducted during the middle growth stage, and the amount of panicle fertilizer applied can be adjusted based on the nitrogen nutritional status of the rice. Traditional chemical diagnosis can more accurately reflect the nitrogen nutrient status of crops, but it requires destructive sampling, which consumes a lot of manpower, takes a long time, and requires high costs. It is difficult to achieve real-time monitoring of rice and cannot be used in actual production. Remote sensing technology is widely used in large areas, which has the characteristics of large coverage area and rapid decision-making. It can be used in agriculture to monitor crop growth, crop stress and predict crop yield. Its application is mainly related to the spectral characteristics of plant leaves. chlorophyll strongly absorbs blue and red light to form absorption peaks, and strongly reflects red edges and near-infrared light to form absorption valleys. Nitrogen deficiency in crops will cause chlorophyll to strengthen its reflection of visible light and mid-infrared bands and weaken its reflection of near-infrared light. The agricultural application of remote sensing technology has further expanded the application scale of plant nitrogen nutrition diagnosis, making large-area non-destructive, rapid diagnosis and accurate fertilization recommendations become available.

The accurate determination of the recommended amount of rice panicle fertilizer nitrogen not only relies on the accurate diagnosis of rice plant nitrogen nutrition, but also is related to the target yield. That is, the recommended amount of panicle fertilizer nitrogen is a function of the nitrogen nutritional demand under the target yield, the previous nitrogen amount, the diagnosis period, rice nitrogen nutrition and panicle fertilizer nitrogen use efficiency; the current recommended amount of rice panicle fertilizer nitrogen is commonly used to determine the target yield determined before production, which is empirical; and the crop growth model is based on the quantitative relationship between crop growth, development, yield formation environmental conditions and field management measures. It has a strong mechanism to dynamically and continuously simulate the growth, development and yield formation process of crops through real-time model parameter input. Therefore, real-time simulation of crop yield through crop models is a feasible and key measure for accurately determining the amount of panicle fertilizer nitrogen. However, the crop model simulates point data, which is a continuous mechanistic simulation of the crop growth and development process. When it develops into a region, the required input parameters can often only obtain limited spatial discrete data, and spatial heterogeneity is difficult to reflect. Remote sensing technology has macroscopic and real-time characteristics. By integrating remote sensing detection data into the crop model process simulation, on the basis of optimizing the model simulation values at the same time, and changing the model simulation state variables after the optimization time, large-area real-time simulation of crop growth, development and yield can be achieved; therefore, coupling remote sensing technology and crop growth models, integrating the advantages of remote sensing technology in the spatial domain of crop growth and the advantages of crop models in the time domain, is a new way to recommend regional precision fertilization.

SUMMARY OF THE INVENTION

In view of the above technical problems, the purpose of the present invention is to provide an accurate recommending method for rice panicle fertilizer nitrogen based on the crop models and remote sensing coupling. Through remote sensing inversion technology, it can realize the estimation of rice growth and nitrogen nutrition during the key growth period, a multi-source remote sensing inversion spatial dataset based on the rice growth trend is taken as a combination point coupling crop growth model to simulate the rice yield in real time, further combining rice nitrogen nutritional status and nitrogen demand, finally achieving accurate recommendations of panicle fertilizer nitrogen at the plots-level, in order to achieve more accurate, efficient and green rice production.

In order to achieve the above objects, the present invention provides the following technical solutions:

Firstly, this invention constructs a basic database including multi-year multi-point data of aboveground biomass AGB and plant nitrogen concentration Na during the key growth period of rice, multi-source (satellite and UAV) remote sensing data during the key growth period of rice, the actual nitrogen application data of each plot before the application of panicle fertilizer in the predicted year, plot vector layer data in the study area and the Decision Support System for Agrotechnology Transfer (DSSAT) parameter adjustment database; said DSSAT parameter adjustment database includes at least 3 years of nitrogen fertilizer gradient test data, weather data, plot-scale soil data, rice variety information and management data in the rice growth area. Then, remote sensing vegetation index calculation and machine learning regression modeling were used to construct the optimal inversion model of agronomic parameters (aboveground biomass AGB, plant nitrogen concentration Na); furthermore, based on the rice nitrogen dilution curve and aboveground biomass AGB, plant nitrogen concentration Na calculates the nitrogen nutrition index NNI, conducts rice nitrogen nutrition diagnosis based on the NNI threshold range, and integrates it into plots-level nitrogen nutrition diagnosis results with the help of ArcGIS® spatial analysis tools; finally, the remote sensing inversion of aboveground biomass is used as a combination point to couple the localized DSSAT crop growth model simulates rice yield in real time, adjusts the amount of panicle fertilizer and nitrogen based on the yield, and eventually achieves accurate recommendations of panicle fertilizer nitrogen at the plot-level.

An accurate recommendation method for rice panicle fertilizer nitrogen based on crop models and remote sensing coupling, including the following steps:

S1. basic database construction:

Obtain multi-year and multi-point aboveground biomass AGB and plant nitrogen concentration Na data during the key growth period of rice, multi-source remote sensing data during the key growth period of rice, actual nitrogen application data for each plot before panicle fertilizer in the predicted year, plot vector layers in the study area and DSSAT parameter adjustment database, to build a basic database;

Said key growth periods of rice include the tillering stage, panicle initiation stage and stem elongation stage;

Said multi-source remote sensing data during the key growth period of rice includes satellite image data and UVA image data, including multi-year historical data and predicted years data;

S2. Inversion modeling based on agronomic parameter of remote sensing vegetation index;

S2.1. Use ENVI® software to extract the spectral reflectance data of satellite image data and UAV image data of the experimental points in the rice key growth period obtained in step S1, and use the spectral reflectance data of the satellite image data and UAV image data to calculate the vegetation index;

S2.2. Use the linear regression model LinearRegression, nearest neighbor model KNeighborsRegressor, decision tree model DecisionTreeRegressor, support vector machine SVR and random forest model RandomForestRegressor of the scikit-learn library to construct relationship model of each vegetation index obtained in step S2.1 with the aboveground biomass AGB and plant nitrogen concentration Na, the optimal model was screened through model evaluation indicators, and the optimal inversion model of AGB & Na based on satellite remote sensing and the optimal inversion model of AGB & Na based on UAV remote sensing were obtained respectively;

S3. Nitrogen nutrition diagnosis of rice based on nitrogen nutrition index NNI;

S3.1. Use the Geospatial Data Abstraction Library (GDAL) in Python® respectively apply the AGB & Na optimal inversion models based on satellite remote sensing and the AGB & Na optimal inversion models based on UAV remote sensing obtained in step S2, to the satellite image data and UAV image data of the predicted year-corresponding, AGB &Na estimation layers based on satellite remote sensing and AGB & Na estimation layers based on UAV remote sensing obtained in step S1;

S3.2. Respectively calculate the AGB &Na estimation layers based on satellite remote sensing and the AGB &Na estimation layers based on UAV remote sensing obtained in step S3.1 based on the rice nitrogen dilution curve and the band calculation function of ENVI® software, obtain the nitrogen nutrition index NNI layer based on satellite remote sensing and the nitrogen nutrition index NNI layer based on UAV remote sensing;

$$N_c = \begin{cases} a*AGB^{(-b)} & (AGB > 1) \\ a & (AGB < 1) \end{cases} \quad \text{Formula 4}$$

$$NNI = N_a/N_c \quad \text{Formula 5}$$

Formula 4 is the nitrogen dilution curve. In Formula 4 and Formula 5, $N_c$ is the critical nitrogen concentration, unit is g kg$^{-1}$; AGB is the aboveground biomass, unit is t ha$^{-1}$; a and b are the nitrogen dilution curve coefficients; NNI is nitrogen nutrition index; $N_a$ is plant nitrogen concentration, unit is g kg$^{-1}$;

S3.3. Use the ArcGIS® regional analysis tool in combination with the vector layer of the study area plots obtained in step S1, separately analyze the AGB &Na estimation layers based on satellite remote sensing and the AGB &Na estimation layers based on UAV remote sensing obtained in step S3.1, and the NNI layer based on satellite remote sensing and the NNI layer based on UAV remote sensing obtained in step S3.2 are processed, to obtain the plots-level nitrogen nutrition index NNI estimation layer based on satellite remote sensing, plots-level AGB &Na estimation layers, and plots-level nitrogen nutrition index NNI estimation layers and plots-level AGB and Na estimation layers based on UAV remote sensing;

S3.4. Judge the nitrogen nutrition status of each plot in the plot-level nitrogen nutrition index NNI estimation layer obtained from each remote sensing source in step S3.3 based on the NNI threshold range;

NNI<0.95 means nitrogen is deficiency, 0.95<NNI<1.05 means nitrogen is suitable, NNI>1.05 means nitrogen is sufficient;

S4. Accurate recommendation of panicle fertilizer nitrogen based on crop growth model and remote sensing nitrogen nutrition diagnosis;

S4.1. Localization of model genetic parameters of rice growth model DSSAT;

Input the data from the DSSAT parameter adjustment database obtained in step S1 into the DSSAT model, and continuously adjust the genetic coefficient of the model through DSSAT-GLUE and trial-and-error methods;

S4.2. Use ArcGIS® software to extract the raster values of the plot-level AGB & Na estimation layers of each remote sensing source obtained in step S3.3 to obtain the estimated AGB & Na values of each remote sensing source in each plot, and calculate each remote sensing source and plots, the difference in nitrogen uptake of plants in each source plot is PNU$_{difference}$, and the plot-level aboveground biomass AGB estimation of each remote sensing source is input into the localized rice growth model DSSAT obtained in step S4.1, to obtain the plot-level target yield and total recommended nitrogen application rate at middle stage of rice growth of each remote sensing source;

$$PNU = N_a \times AGB \quad \text{Formula 9}$$

$$PNU_C = N_c \times AGB \quad \text{Formula 10}$$

$$PNU_{difference} = PNU - PNU_C \quad \text{Formula 11}$$

In Formula 9 to 11, PNU is the plant nitrogen absorbing amount, unit is kg ha$^{-1}$; PNU$_C$ is the plant critical nitrogen absorbing amount, unit is kg ha$^{-1}$; PNU$_{difference}$ is the difference in plant nitrogen absorbing amount, unit is kg ha$^{-1}$; AGB is the aboveground biomass, unit is tha$^{-1}$; N$_c$ is the critical nitrogen concentration, unit is g kg$^{-1}$; N$_a$ is the plant nitrogen concentration, unit is g kg$^{-1}$;

S4.3. Base on the plots-level target yield and total recommended nitrogen application amount of each remote sensing source obtained in step S4.2, combine with the actual nitrogen application amount data of each plot before panicle fertilizer in the predicted year, according to Formula 12 to calculate the recommend nitrogen amount of panicle fertilizer in each plot of the remote sensing source, and finally achieve accurate recommendations of panicle fertilizer nitrogen at the plots-level of each remote sensing source;

The recommended amount of nitrogen fertilizer for each plot = (total recommended nitrogen application amount − actual nitrogen application amount before panicle fertilizer) − PNU$_{difference}$/nitrogen recovery rate of panicle fertilizer Formula 12

The vegetation index includes green difference vegetation index GDVI, green normalized difference vegetation index GNDVI, green wide dynamic range vegetation index GWDRVI, green chlorophyll index Cig, modified green simple ratio index MSR_G, green soil adjusted vegetation index GSAVI, modified green soil adjusted vegetation index MGSAVI, green optimized soil adjusted vegetation index GOSAVI, green renormalized difference vegetation index GRDVI, normalized difference vegetation index NDVI, ratio vegetation index RVI, optimized soil adjusted vegetation index OSAVI, wide dynamic range vegetation index WDRVI, soil adjusted vegetation index SAVI, modified soil adjusted vegetation index MSAVI, difference vegetation index DVI, renormalized difference vegetation index RDVI, transformed normalized vegetation index TNDVI, optimized vegetation index VIopt, MERIS vegetation index, red edge difference Vegetation index REDVI, normalized difference red edge vegetation index NDRE, red edge optimized soil adjusted vegetation index REOSAVI, red edge difference vegetation index 1 RDVI1, red edge normalized difference vegetation index RENDVI, red edge green ratio vegetation index REGRVI, red edge green difference vegetation index REGDVI, red edge green normalized difference vegetation index REGNDVI, MERIS terredtrial chlorophyll index MTCI, normalized green index NGI, normalized red edge index NRI, normalized near infrared index NNIR, modified double difference index MDD, modified enhanced vegetation index MEVI, modified normalized difference red edge index MNDRE, modified chlorophyll absorption in reflectance index 1 MCARI1, modified chlorophyll absorption in reflectance index 2 MCARI2, modified transformed chlorophyll absorption in reflectance index MTCARI, modified canopy chlorophyll content index MCCCI.

The DSSAT parameter adjustment database includes at least 3 years of nitrogen fertilizer gradient test data, weather data, plots-scale soil data, rice variety information and management data in rice planting areas; the weather data includes daily maximum temperature, daily minimum temperature, daily sunshine hours, daily precipitation, humidity, wind direction and cloud thickness; the soil data includes soil pH, soil organic matter, soil total nitrogen, soil available phosphorus, soil available potassium, soil bulk density, soil texture, soil moisture, soil cation exchange capacity, soil nitrate nitrogen and soil ammonium nitrogen; the nitrogen fertilizer gradient test data includes the flowering period, maturity period time and yield of rice under different nitrogen fertilizer dosage gradients, as well as the aboveground biomass, leaf area index, grain weight and chlorophyll content under different nitrogen fertilizer dosage gradients and the key growth period of rice; wherein, the nitrogen fertilizer gradient is: no nitrogen application, 50% of the local recommended nitrogen application, 100% of the local recommended nitrogen application and 150% of the local recommended nitrogen application; the amounts are recorded as N0, N1, N2, and N3 respectively; the amount of phosphorus and potassium fertilizer used in each nitrogen fertilizer gradient is the local recommended amount of phosphorus and potassium.

Said key growth periods of rice are: tillering stage, panicle initiation stage, stem elongation stage, heading stage, 20 days after heading and maturity stage; the management data includes plots information, agricultural operation information, fertilization information and environmental information.

In said step S2.2, the scikit-learn library is a Python® machine learning library, with aboveground biomass AGB and plant nitrogen concentration Na as independent variables, and the corresponding vegetation index as dependent variables.

In said step S2.2, the model evaluation index includes the coefficient of determination R$^2$, the mean absolute error MAE and the root mean square error RMSE, according to the principle that the larger the coefficient of determination R$^2$ is, the smaller the mean absolute error MAE and the root mean square error RMSE are, to screen the optimal model:

$$R^2 = \frac{\sum (y_i - \bar{y})^2}{\sum (x_i - \bar{y})^2} \quad \text{Formula 1}$$

$$RMSE = \sqrt{\frac{1}{n}\sum_{i=1}^{n}(x_i - y_i)^2} \quad \text{Formula 2}$$

$$MAE = \frac{1}{n}\sum_{i=1}^{n}|y_i - x_i| \qquad \text{Formula 3}$$

In Formula 1 to Formula 3, $R^2$ is the coefficient of determination; MAE is the mean absolute error; RMSE is the root mean square error; yi is the model prediction value; xi is the measured value; $\overline{y}$ is the average of the actual measured value; n is the amount of samples participating in the calculation.

In step S4.1, use the coefficient of determination $R^2$, the normalized root mean square error nRMSE and the average error E between agronomic parameters of aboveground biomass, leaf area index, grain weight and chlorophyll content predicted by the model after adjusting the genetic parameters and the actual measured values as the evaluation index, until $R^2$ reaches more than 85% and nRMSE is less than 15%, the model parameter adjustment is completed and the model localization is realized; wherein the average error E<0 or E>0 is used to judge whether the model underestimates or overestimates the above agronomic parameters; the genetic parameters at this time are the localized genetic parameters, and the DSSAT model at this time is the localized model;

$$E = \sum(y_i - x_i)/n \qquad \text{Formula 6}$$

$$R^2 = \frac{\sum(y_i - \overline{y})^2}{\sum(x_i - \overline{y})^2} \qquad \text{Formula 7}$$

$$nRMSE = 100 \times \frac{\sqrt{(1/n)\sum(y_i - x_i)^2}}{\sum x_i/n} \qquad \text{Formula 8}$$

In Formulas 6 to 8, E is the average error; $R^2$ is the coefficient of determination; nRMSE is the normalized root mean square error; $y_i$ is the model prediction value; $x_i$ is the actual measured value; $\overline{y}$ is the average of the actual measured value; n is the amount of samples participating in the calculation.

Compared with the prior arts, the beneficial effects of the present invention are:

The traditional panicle fertilizer nitrogen recommendation method determines the total nitrogen application amount based on the target yield set before production, then applies basal tiller fertilizer and panicle fertilizer according to a certain fixed ratio according to the rice nutrient absorption rules, either directly or in the middle stage of rice growth for nutritional diagnosis, adjust the nitrogen application amount of panicle fertilizer according to the nitrogen nutritional status of rice. However, traditional chemical diagnosis requires destructive sampling, which is time-consuming and labor-intensive, it is difficult to achieve real-time large-area monitoring of rice. At the same time, determining the amount of panicle fertilizer and nitrogen based on the target yield set before production is empirical and cannot be accurately matched a real-time crop growth of development dynamics and yield formation process. Therefore, the present invention combines the instantaneous and spatial domain advantages of remote sensing technology in crop nutrition monitoring and the continuous and mechanistic simulation advantages of crop growth and development processes of crop models to achieve rice growth and nitrogen nutrition during the critical growth period through remote sensing inversion technology. The multi-source remote sensing inversion spatial dataset based on the rice growth trend is taken as a combination point coupling crop growth model to simulate the rice yield in real time, it is further combined with the rice nitrogen nutrition remote sensing monitoring spatial dataset and nitrogen demand, finally achieve accurate panicle fertilizer nitrogen recommendation at the plots-level.

DETAILED DESCRIPTION OF EMBODIMENTS

The present invention will be further described below in conjunction with the accompanying drawings and embodiments.

Figure 1:
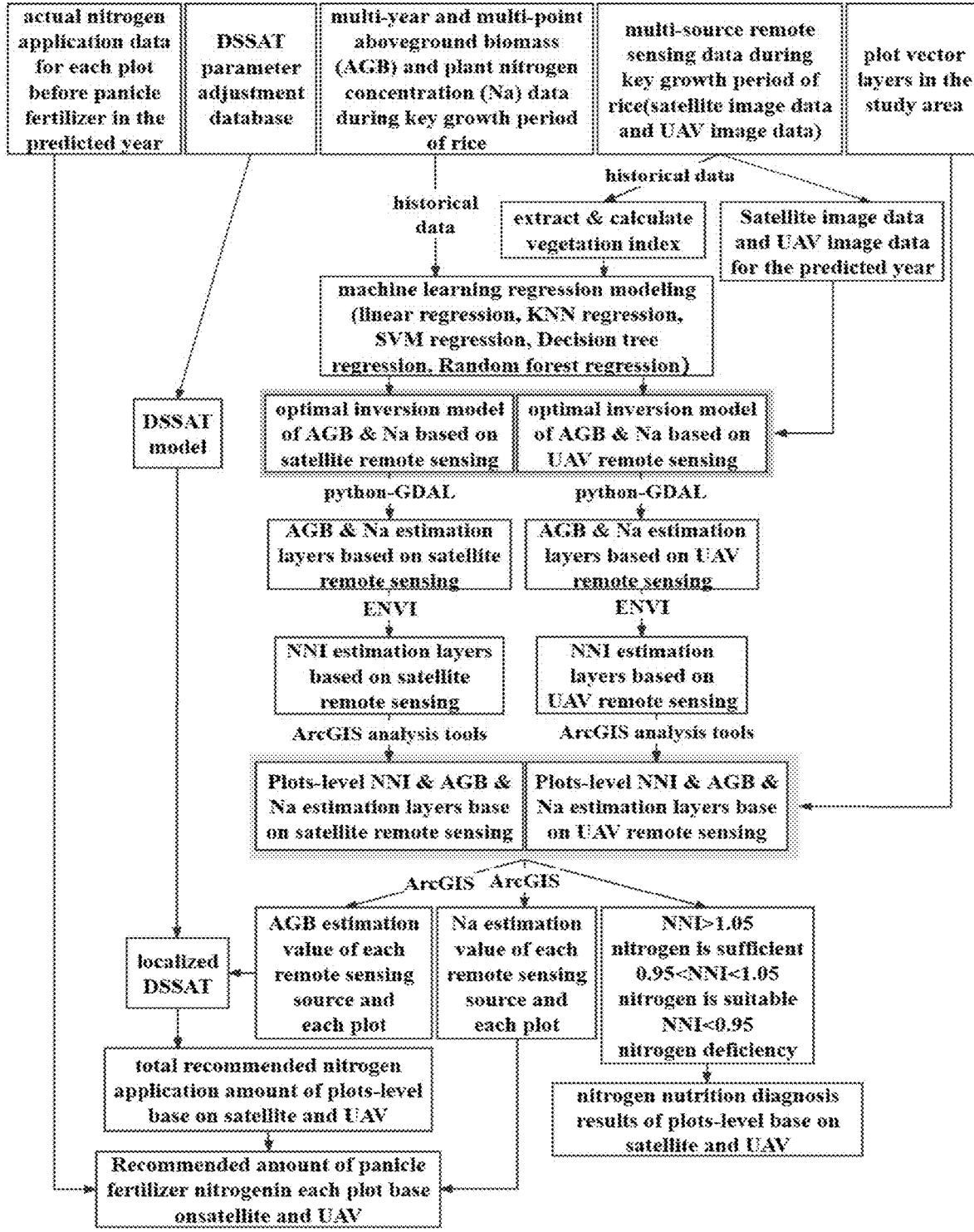
FIG. 1 is a flow chart of the accurate recommendation method for rice panicle fertilizer and nitrogen based on the crop models and remote sensing coupling according to the present invention.

As shown in FIG. 1, an accurate recommendation method for rice panicle fertilizer and nitrogen based on the coupling of crop models and remote sensing includes the following steps:

S1, basic database construction;

Obtain multi-year and multi-point aboveground biomass AGB and plant nitrogen concentration Na data during the critical growth period of rice, multi-source remote sensing data during key growth period of rice, actual nitrogen application data for each plot before panicle fertilizer in the predicted year, and plot vector layers in the study area, as well as DSSAT parameter adjustment database, to build a basic database. See Table 1 for details;

The key growth periods of rice include the tillering stage, panicle initiation stage and stem elongation stage;

The multi-source remote sensing data during the key growth period of rice includes satellite image data and UAV image data, including multi-year historical data and predicted year data;

The DSSAT parameter adjustment database includes at least three years of nitrogen fertilizer gradient test data, weather data, plots-scale soil data, rice variety information and management data in rice planting areas. The weather data includes daily maximum temperature, daily minimum temperature, daily sunshine hours, daily precipitation, humidity, wind direction and cloud thickness; said soil data includes soil pH, soil organic matter, soil total nitrogen, soil available phosphorus, soil available potassium, soil bulk density, soil texture, soil moisture, soil cation exchange capacity, soil nitrate nitrogen and soil ammonium nitrogen; said nitrogen fertilizer gradient test data includes: the flowering period time, maturity period time, aboveground biomass, leaf area index, grain weight chlorophyll content and yield under different nitrogen fertilizer dosage gradients and during the key growth period of rice.

Wherein, said nitrogen fertilizer gradient is: no nitrogen treatment, 50% of the local recommended nitrogen applied amount, 100% of the local recommended nitrogen applied amount and 150% of the local recommended nitrogen applied amount, respectively recorded as N0, N1, N2, N3; Nitrogen fertilizer in this embodiment in the gradient of N1=50 kg N/ha, N2=100 kg N/ha, N3=150 kg N/ha; the amount of phosphorus and potassium fertilizer used in each nitrogen fertilizer gradient is the local recommended amount of phosphorus and potassium; said key growth period of rice is: tillering stage, panicle initiation stage, stem elongation stage, heading stage, 20 days after heading and maturity stage; said management data includes plots information, agricultural operation information, fertilization information and environmental information.

The vegetation index includes green difference vegetation index GDVI, green normalized difference vegetation index GNDVI, green wide dynamic range vegetation index GWDRVI, green chlorophyll index Cig, modified green simple ratio index MSR_G, green soil adjusted vegetation index GSAVI, modified green soil adjusted vegetation index MGSAVI, green optimized soil adjusted vegetation index GOSAVI, green renormalized difference vegetation index GRDVI, normalized difference vegetation index NDVI, ratio vegetation index RVI, optimized soil adjusted vegetation index OSAVI, wide dynamic range vegetation index WDRVI, soil adjusted Vegetation index SAVI, modified soil adjusted vegetation index MSAVI, difference vegetation index DVI, renormalized difference vegetation index RDVI, transformed normalized vegetation index

TABLE 1

Basic database

| Data list | Explanation |
| --- | --- |
| 1. Aboveground biomass AGB data during the critical growth period of rice | The key growth periods of rice (before applying panicle fertilizer): the tillering stage, panicle initiation stage and stem elongation stage<br>Aboveground biomass data is the test point data |
| 2. Plant nitrogen concentration (Na) data during the key growth period of rice | The key growth periods of rice (before applying panicle fertilizer): the tillering stage, panicle initiation stage and stem elongation stage<br>The plant nitrogen concentration Na data is test point data |
| 3. Key growth period of rice multi-source remote sensing data | Satellite image data (image obtain stages: the tillering stage, panicle initiation stage and stem elongation stage of rice; layer data)<br>UAV image data (image obtain stages: the tillering stage, panicle initiation stage and stem elongation stage of rice; layer data) |
| 4. Plots vector layers in the study area | The layer data is accurate to the scale of plots units scale |
| 5. DSSAT parameter adjustment database | The DSSAT parameter adjustment database includes at least three years of nitrogen fertilizer gradient test data, weather data, plot-scale soil data, rice variety information and management data in rice planting areas.<br>a) The weather data includes daily maximum temperature, daily minimum temperature, daily sunshine hours, daily precipitation, humidity, wind direction and cloud thickness;<br>b) the soil data includes soil pH, soil organic matter, soil total nitrogen, soil available phosphorus, soil available potassium, soil bulk density, soil texture, soil moisture, soil cation exchange capacity, soil nitrate nitrogen and soil ammonium nitrogen;<br>c) The nitrogen fertilizer gradient test data includes: the flowering period time, maturity period time, aboveground biomass, leaf area index, grain weight chlorophyll content and yield under different nitrogen fertilizer dosage gradients and during the key growth period of rice.<br>Wherein, the nitrogen fertilizer gradient is: N0, N50, N100 and N 150;<br>the key growth period of rice is: tillering stage, panicle initiation stage, stem elongation stage, heading stage, 20 days after heading and maturity stage;<br>d) The management data includes plot information, agricultural operation information, fertilization information and environmental information |
| 6. Predict year actual nitrogen application amount in each plot before panicle fertilization | Research and organize the actual nitrogen applied amount of each plot before panicle fertilization on the vector layer of the corresponding research area plot |

S2. Agronomic parameter inversion modeling based on remote sensing vegetation index;

S2.1. Use ENVI® software to extract the spectral reflectance data of satellite image data and UAV image data of the experimental points in the rice key growth period obtained in step S1, and use the spectral reflectance data of the satellite image data and UAV image data to calculated vegetation index data, see Table 2 for details;

TNDVI, optimized vegetation index VIopt, MERIS vegetation index, red edge difference Vegetation index REDVI, normalized difference red edge vegetation index NDRE, red edge optimized soil adjusted vegetation index REOSAVI, red edge difference vegetation index 1 RDVI1, red edge normalized difference vegetation index RENDVI, red edge green ratio vegetation index REGRVI, red edge green difference vegetation index REGDVI, red edge green normalized vegetation index REGNDVI, MERIS terrestrial chlorophyll index MTCI, normalized green index NGI, normalized red edge index NRI, normalized near infrared index NNIR, modified double difference index MDD, modified enhanced vegetation index MEVI, modified normalized difference red edge index MNDRE, modified chlorophyll absorption in reflectance index 1 MCARI1, modified chlorophyll absorption in reflectance index 2 MCARI2, modified transformed chlorophyll absorption in reflectance rate index MTCARI, modified canopy chlorophyll content index MCCCI;

S2.2. Use the linear regression model LinearRegression, nearest neighbor model KNeighborsRegressor, decision tree model DecisionTreeRegressor, support vector machine SVR and random forest model RandomForestRegressor of the scikit-learn library to construct relationship model of each vegetation index obtained in step S2.1, with the aboveground biomass AGB and plant nitrogen concentration Na, the optimal model was screened through model evaluation indicators, the optimal inversion model of AGB &Na based on satellite remote sensing and the optimal inversion model of AGB & Na based on UAV remote sensing were obtained respectively;

The scikit-learn library is an existing Python® machine learning library; it uses aboveground biomass AGB and plant nitrogen concentration Na as independent variables, uses the corresponding vegetation index as dependent variables; it can be input into the above machine learning regression model to constructed the relationship model between vegetation index, aboveground biomass AGB and plant nitrogen concentration Na.

The model evaluation indicators include the coefficient of determination $R^2$, the mean absolute error MAE and the root mean square error RMSE. The optimal model is screened based on the principle that the larger the coefficient of determination $R^2$ is, the smaller the mean absolute error MAE and the root mean square error RMSE are.

$$R^2 = \frac{\sum (y_t - \overline{y})^2}{\sum (x_t - \overline{y})^2} \quad \text{Formula 1}$$

$$RMSE = \sqrt{\frac{1}{n}\sum_{i=1}^{n}(x_i - y_i)^2} \quad \text{Formula 2}$$

$$MAE = \frac{1}{n}\sum_{i=1}^{n}|y_i - x_i| \quad \text{Formula 3}$$

In Formula 1 to Formula 3, $R^2$ is the coefficient of determination; MAE is the mean absolute error; RMSE is the root mean square error; $y_i$ is the model prediction value; $x_i$ is the actual measured value; $\overline{y}$ is the average of the actual measured value; n is the amount of samples participating in the calculation.

TABLE 2

List of vegetation indices

| Vegetation index | Full English text of vegetation index | Formulas |
|---|---|---|
| GDVI | Green difference vegetation index | NIR − G |
| GNDVI | Green normalized difference vegetation index | (NIR − G)/(NIR + G) |
| GWDRVI | Green wide dynamic range vegetation index | (0.12 × NIR − G)/(0.12 × NIR + G) |
| Cig | Green chlorophyll index | NIR/G − 1 |
| MSR_G | Modified green simple ratio | (NIR/G − 1)/$\sqrt{NIR/G + 1}$ |
| GSAVI | Green soil adjusted vegetation index | 1.5 × (NIR − G)/(NIR + G + 0.5) |
| MGSAVI | Modified green SAVI | 0.3 × (2.0 × NIR + 1 − $\sqrt{(2 \times NIR +1)^2 - 8.0 \times (NIR - G)}$) |
| GOSAVI | Green Optimized SAVI | 1.16 × (NIR − G)/(NIR + G + 0.16) |
| GRDV | Green renormalized difference vegetation index | (NIR − G)/$\sqrt{(NIR) + G}$ |
| NDVI | Normalized difference vegetation index | (NIR − R)/(NIR + R) |
| RVI | Ratio vegetation index | NIR/R |
| OSAVI | Optimized SAVI | 1.16 × (NIR − R)/(NIR + R + 0.16) |
| WDRVI | Wide dynamic range vegetation index | (0.12 × NIR − R)/(0.12 × NIR + R) |
| SAVI | Soil adjusted vegetation index | 1.5 × (NIR − R)/(NIR + R + 0.3) |
| MSAVI | Modified SAVI | 0.3 × (2.0 × NIR + 1 − $\sqrt{(2.0 \times NIR +1)^2 - 8.0 \times (NIR - R)}$) |
| DVI | Difference vegetation index | NIR − R |

TABLE 2-continued

List of vegetation indices

| Vegetation index | Full English text of vegetation index | Formulas |
|---|---|---|
| RDVI | Renormalized difference vegetation index | $(NIR - R)/\sqrt{NIR + R}$ |
| TNDVI | Transformed normalized vegetation index | $\sqrt{(NIR - R)/(NIR + R) + 0.5}$ |
| VIopt | Optimized vegetation index | $1.45 \times (NIR^3 + 1.0)/(R + 0.45)$ |
| MERIS | MERIS | $(R + NIR)/2.0$ |
| REDVI | Red edge difference vegetation index | $NIR - RE$ |
| NDRE | Normalized difference red edge | $(NIR - RE)/(NIR + RE)$ |
| REOSAVI | Red edge optimal soil adjusted vegetation index | $1.16 \times (NIR - RE)/(NIR + RE + 0.16)$ |
| RDVI1 | Red edge difference Vegetation Index1 | $RE - R$ |
| RENDVI | Red edge normalized difference vegetation index | $(RE - R)/(RE + R)$ |
| REGRVI | Red edge green ratio vegetation index | $RE/G$ |
| REGDVI | Red edge green difference vegetation index | $RE - G$ |
| REGNDVI | Red edge green normalized difference vegetation index | $(RE - G)/(RE + G)$ |
| MTCI | MERIS terrestrial chlorophyll index | $(NIR - RE)/(RE - R)$ |
| NGI | Normalized green index | $G/(NIR + RE + G)$ |
| NRI | Normalized red edge index | $R/(NIR + RE + R)$ |
| NNIR | Normalized NIR index | $NIR/(NIR + RE + G)$ |
| MDD | Modified double difference index | $NIR - 2 \times RE + G$ |
| MEVI | Modified enhanced vegetation index | $2.5 \times (NIR - RE)/(NIR + 6 \times RE - 7.5 \times G + 1)$ |
| MNDRE | Modified normalized difference red edge | $(NIR - (RE - 2.0 \times G))/(NIR + (RE - 2 \times G))$ |
| MCARI1 | Modified chlorophyll absorption in reflectance index1 | $(NIR - RE - 0.2 \times (NIR - G)) \times NIR/RE$ |
| MCARI2 | Modified chlorophyll absorption in reflectance index2 | $\dfrac{1.5 \times (2.5 \times NIR - RE) - 1.3 \times (NIR - G)}{\sqrt{(2 \times NIR + 1)^2 - (6 \times NIR - 5 \times \sqrt{RE}) - 0.5}}$ |
| MTCARI | Modified transformed Chlorophyll Absorption in Reflectance Index | $3 \times (NIR - RE - 0.2 \times (NIR - G) \times NIR/RE)$ |
| MCCCI | Modified canopy chlorophyll content index | $NDRE/GNDVI$ |

In Table 2, G, R, RE and NIR respectively represent the spectral reflectance data of the green band, red band, red edge band and near-infrared band of the remote sensing data of each channel.

S3. Nitrogen nutrition diagnosis of rice based on nitrogen nutrition index NNI;

S3.1. Use the Geospatial Data Abstraction Library (GDAL) in Python® to apply the AGB &Na optimal inversion models based on satellite remote sensing obtained in step S2 and the AGB & Na optimal inversion models based on UAV remote sensing, to respectively predicted year-corresponding satellite image data and UAV image data, AGB &Na estimation layers based on satellite remote sensing and AGB &Na estimation layers based on UAV remote sensing obtained in step S1.

Said multi-source remote sensing data during the key growth period of rice are layers data, including historical data and predicted year data; the GDAL library is a library that specializes in processing various raster geographic data formats. Use the GDAL library to load and extract the pixel values of each pixel of the remote sensing image data, then load the optimal inversion model of AGB &Na based on satellite remote sensing and the optimal inversion model of AGB &Na based on UAV remote sensing obtained in step S2.2, each pixel value is calculated as the corresponding agronomic parameter (aboveground biomass AGB and plant nitrogen concentration Na); finally, the GDAL library reintegrates the calculated value into the original remote sensing image data format according to the spatial position of the original pixel, thus the AGB &Na estimation layers based on satellite remote sensing and the AGB & Na estimation layers based on UAV remote sensing are obtained.

S3.2. Based on the rice nitrogen dilution curve and the band calculation function of ENVI® software, respectively calculate the AGB &Na estimation layers based on satellite remote sensing and the AGB &Na estimation layers based on UAV remote sensing obtained in step S3.1, to obtain the nitrogen nutrition index NNI layers based on satellite remote sensing and the nitrogen nutrition index NNI layers based on UAV remote sensing;

$$N_c = \begin{cases} a*AGB^{(-b)} & (AGB \geq 1) \\ a & (AGB < 1) \end{cases} \quad \text{Formula 4}$$

$$NNI = N_a/N_c \quad \text{Formula 5}$$

Figure 2:
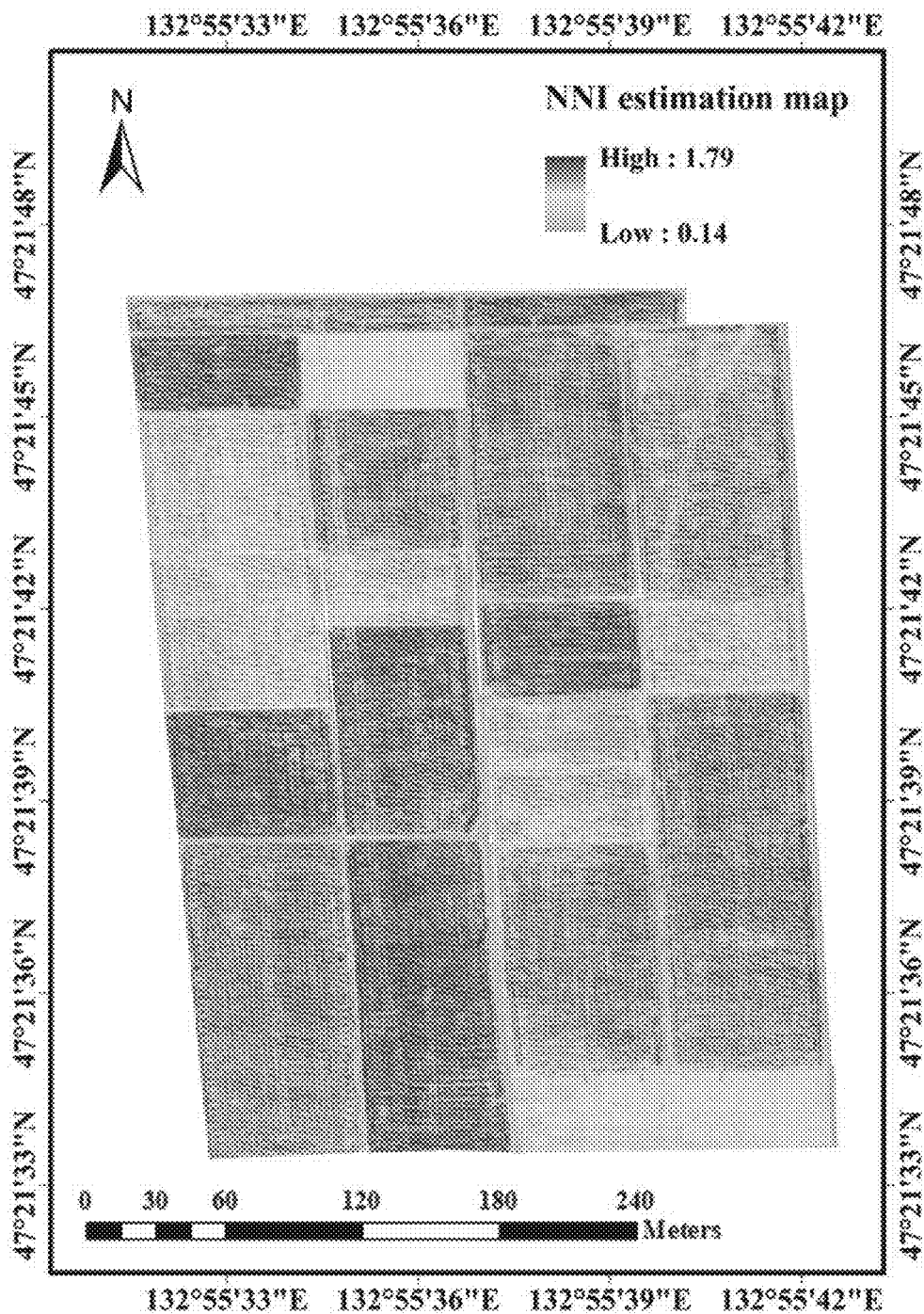
FIG. 2 shows the nitrogen nutrition index (NNI) estimation map of the experimental area based on UAV remote sensing.
Figure 3A:
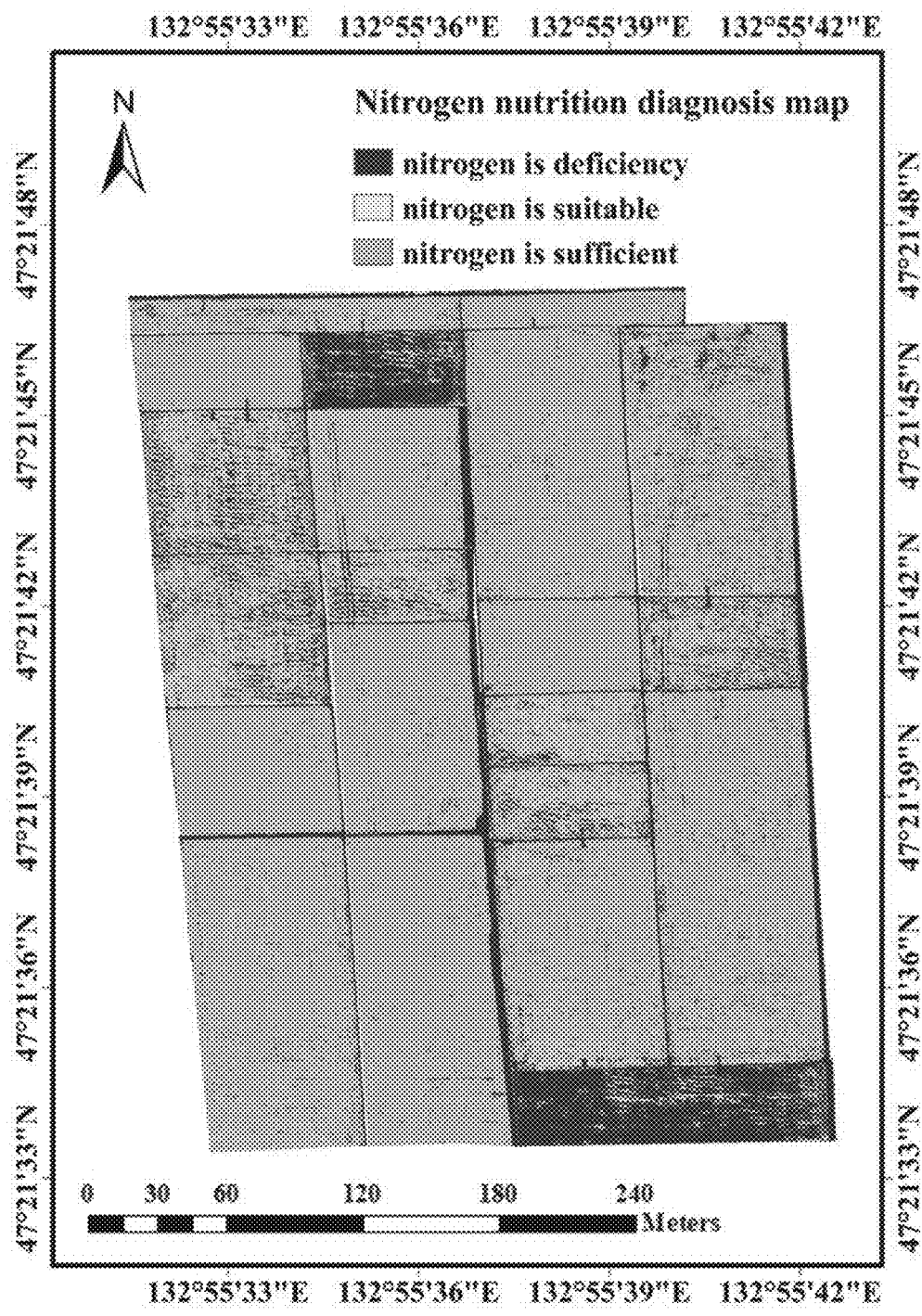
FIG. 3a is a diagnostic map of nitrogen nutrition in the experimental area based on UAV remote sensing.
Figure 3B:
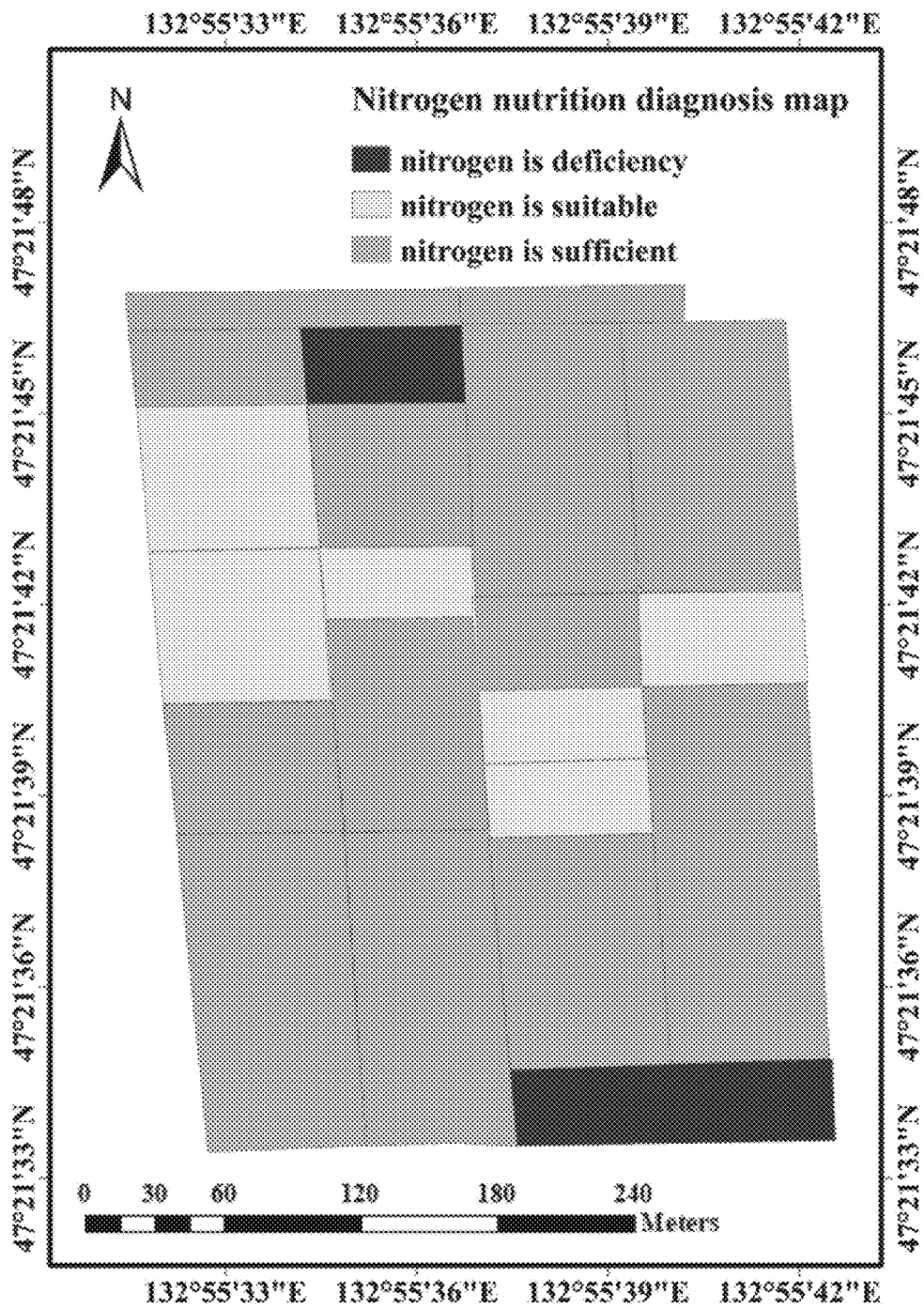
FIG. 3b is a diagnostic map of nitrogen nutrition in the plots of experimental area based on UAV remote sensing.

Formula 4 is the nitrogen dilution curve of rice in the planting area of this embodiment (this curve is from the reference provided a formula suitable for rice in cold areas: Huang S Y, Miao Y X, Cao Q, Yao Y K, Zhao G M, Yu W F, Shen J N, Yu K, Bareth G. 2018. A new critical nitrogen dilution curve for rice nitrogen status diagnosis in Northeast China. Pedosphere. 28(5): 814-822. The a=27.7, b=0.34), in Formula 4 and Formula 5, $N_c$ is critical nitrogen concentration, unit is g kg$^{-1}$; AGB is aboveground biomass, unit is t ha$^{-1}$; NNI is nitrogen nutritional index; $N_a$ is plant nitrogen concentration, unit is g kg−1;

S3.3. Use the ArcGIS® regional analysis tool in combination with the vector layer of the study area plots obtained in step S1, to respectively analyze the AGB & Na estimation layers based on satellite remote sensing and the AGB &Na estimation layers based on UAV remote sensing obtained in step S3.1, the NNI layer based on satellite remote sensing and the NNI layer based on UAV remote sensing obtained in step S3.2 are processed, to obtain the plot-level nitrogen nutrition index NNI estimation layer based on satellite remote sensing (see FIG. 2) and plots-level AGB &Na estimation layers, as well as plots-level nitrogen nutrition index NNI estimation layers and plots-level AGB &Na estimation layers based on UAV remote sensing; S3.4. Judge the nitrogen nutrition status of each plot in the plots-level nitrogen nutrition index NNI estimation layer obtained from each remote sensing source in step S3.3 based on the NNI threshold range;

NNI<0.95 means nitrogen deficiency, 0.95<NNI<1.05 means nitrogen is suitable, and NNI>1.05 means nitrogen is sufficient (see FIG. 3a and FIG. 3b for details).

S4. Accurate recommendation of panicle fertilizer nitrogen based on crop growth model and remote sensing nitrogen nutrition diagnosis;

S4.1. Localization of genetic parameters of rice growth model DSSAT model;

Input the data in the DSSAT parameter adjustment database obtained in step S1 into the existing DSSAT (Decision Support System For Agro-technology Transfer) model, continuously adjust the genetic coefficient of the model through DSSAT-GLUE and trial-and-error methods to adjust the genetic parameters, after adjusting the genetic parameters, the model predicted the coefficient of determination R$^2$, normalized root mean square error nRMSE and average error E between aboveground biomass, leaf area index, grain weight and chlorophyll content of agronomic parameters and the actual measured values are used as evaluation indicators, until R$^2$ reaches above 85%, nRMSE less than 15%, the model parameter adjustment is completed and the model is localized, wherein, the average error E<0 or E>0 is used to judge whether the model underestimates or overestimates the above agronomic parameters; the genetic parameters at this time are the localized genetic parameters. The DSSAT model at the time is the localized model;

$$E = \sum (y_i - x_i)/n \quad \text{Formula 6}$$

$$R^2 = \frac{\sum (y_i - \overline{y})^2}{\sum (x_i - \overline{y})^2} \quad \text{Formula 7}$$

$$nRMSE = 100 \times \frac{\sqrt{(1/n)\sum(y_i - x_i)^2}}{\sum x_i/n} \quad \text{Formula 8}$$

In Formulas 6 to 8, E is the average error; R$^2$ is the coefficient of determination; nRMSE is the normalized root mean square error; $y_i$ is the model prediction value; $x_i$ is the actual measured value; $\overline{y}$ is the average of the actual measured value; n is the amount of samples participating in the calculation.

S4.2. Use ArcGIS® software to extract the raster values of the plot-level AGB &Na estimation layers of each remote sensing source obtained in step S3.3 to obtain the estimated AGB & Na values of each remote sensing source and each plot, calculate each remote sensing source the difference in nitrogen uptake of plants in each source plot PNU$_{difference}$, and the plot-level aboveground biomass AGB estimate of each remote sensing source is input into the localized rice growth model DSSAT obtained in step S4.1, to obtain the plot-level target yield and total recommended nitrogen application rate at middle stage of rice growth of each remote sensing source;

$$PNU = N_a \times AGB \quad \text{Formula 9}$$

$$PNU_C = N_c \times AGB \quad \text{Formula 10}$$

$$PNU_{difference} = PNU - PNU_c \qquad \text{Formula 11}$$

In Formula 9 to 11, PNU is the nitrogen uptake amount of the plant, unit is kg ha$^{-1}$; PNU$_C$ is the critical plant nitrogen absorbing amount, unit is kg ha$^{-1}$; PNU$_{difference}$ is the difference in plant nitrogen absorbing amount, unit is kg ha$^{-1}$; AGB is the aboveground biomass, unit is t ha$^{-1}$; N$_c$ is the critical nitrogen concentration, unit is g kg$^{-1}$; N$_a$ is the plant nitrogen concentration, unit is g kg$^{-1}$.

Figure 4:
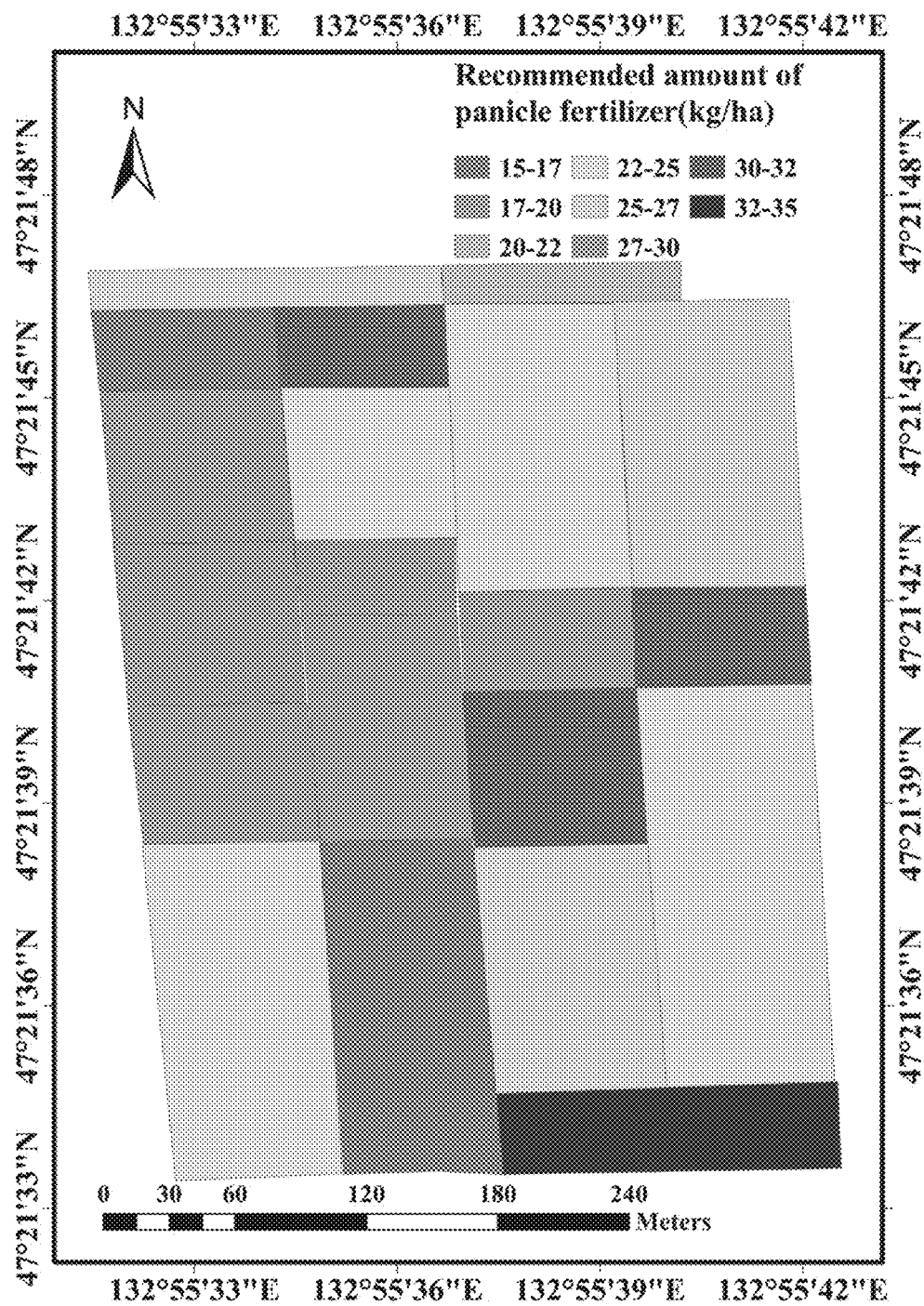
FIG. 4 is a recommended map of panicle fertilizer and nitrogen for plots based on the coupling of the model and UAV remote sensing.

S4.3. Based on the plot-level target yield and total recommended nitrogen application amount of each remote sensing source obtained in step S4.2, combined with the actual nitrogen application amount data of each plot before panicle fertilizer in the predicted year, according to Formula 12 calculate the recommended amount of panicle fertilizer nitrogen in each plot of each remote sensing source, is finally achieve accurately recommend the amount of panicle fertilizer nitrogen at plot-level of each remote sensing source, as shown in FIG. 4;

The recommended amount of nitrogen fertilizer for each plot=(total recommended nitrogen application amount−actual nitrogen application amount before panicle fertilizer)−PNU$_{difference}$/panicle fertilizer nitrogen recovery rate    Formula 12

In Formula 12, the nitrogen recovery rate of panicle fertilizer is 62.5%.

The invention claimed is:

1. A method for recommending rice panicle fertilizer nitrogen based on crop growth models and remote sensing coupling, comprising the following steps:
step S1: constructing a basic database, comprising:
obtaining a multi-year and multi-point aboveground biomass and plant nitrogen concentration data during a key growth period of rice, multi-source remote sensing data during the key growth period of rice, nitrogen application amount data for each plot before panicle fertilizer in target years, plot vector layer data in a study area and a decision support system for agrotechnology transfer (DSSAT) parameter adjustment database, to build the basic database;
wherein the key growth periods of rice include: tillering stage, panicle initiation stage and stem elongation stage;
wherein said multi-source remote sensing data during the key growth period of rice includes satellite image data and unmanned aerial vehicles (UAV) image data, including multi-year historical data and target years data;
step S2: constructing agronomic parameter inversion modeling based on remote sensing a vegetation index, comprising:
step S2.1: extracting spectral reflectance data of satellite image data and UAV image data of experimental points in the key growth period of rice obtained in the step S1, and using the spectral reflectance data of the satellite image data and UAV image data to calculate the vegetation index;
step S2.2: using a linear regression model, nearest neighbor model r, decision tree model, support vector machine and random forest model of a machine learning library, to construct relationship models of each vegetation index obtained in the step S2.1, with the aboveground biomass and plant nitrogen concentration, the optimal model is screened through model evaluation indicators, and optimal inversion models of the aboveground biomass and the plant nitrogen concentration based on satellite remote sensing and the optimal inversion models of the aboveground biomass and plant nitrogen concentration based on UAV remote sensing are obtained respectively;
step S3: performing a rice nitrogen nutrition diagnosis based on nitrogen nutrition index, comprising:
step S3.1: using a geospatial data abstraction library to respectively apply the aboveground biomass and plant nitrogen concentration optimal inversion models based on satellite remote sensing and UAV remote sensing obtained in the step S2 to the satellite image data and UAV image data of the target years, to obtain aboveground biomass and plant nitrogen concentration estimation layers based on satellite remote sensing and UAV remote sensing;
step S3.2: calculating the aboveground biomass and the plant nitrogen concentration estimation layers based on satellite remote sensing and UAV remote sensing obtained in the step S3.1 based on a rice nitrogen dilution curve, obtain the nitrogen nutrition index layer based on satellite remote sensing and the nitrogen nutrition index layer based on UAV remote sensing;
wherein the critical nitrogen concentration is calculated, as follows:

$$N_c = \begin{cases} a*AGB^{(-b)} & (AGB \geq 1) \\ a & (AGB < 1) \end{cases};$$

wherein nitrogen nutrition index (NNI) is calculated, as follows:

NNI=$N_a$/$N_c$;

wherein, $N_c$ is the critical nitrogen concentration, whose unit is g kg−1; AGB is the aboveground biomass, whose unit is t ha$^{-1}$; a and b are the nitrogen dilution curve coefficients; $N_a$ is plant nitrogen concentration, whose unit is g kg−1;
step S3.3: using a regional analysis tool in combination with the vector layer of the study area plots obtained in the step S1, to separately process the aboveground biomass and plant nitrogen concentration estimation layers based on satellite remote sensing and the aboveground biomass and plant nitrogen concentration estimation layers based on UAV remote sensing obtained in the step S3.1 as well as the nitrogen nutrition index layer based on satellite remote sensing and the nitrogen nutrition index layer based on UAV remote sensing obtained in the step S3.2, to obtain the plots-level nitrogen nutrition index estimation layer and plots-level aboveground biomass and plant nitrogen concentration estimation layers based on satellite remote sensing, and plots-level nitrogen nutrition index estimation layers and plots-level aboveground biomass and plant nitrogen concentration estimation layers based on UAV remote sensing;
step S3.4: judging the nitrogen nutrition status of each plot in the plots-level nitrogen nutrition index estimation layer obtained from each remote sensing source in the step S3.3 based on the nitrogen nutrition index threshold range;
wherein NNI<0.95 means nitrogen deficiency, 0.95<NNI<1.05 means nitrogen is suitable, and NNI>1.05 means nitrogen is sufficient;

step S4: calculating recommendation of panicle fertilizer nitrogen, comprising step S4.1: localizing genetic parameters of a rice growth model, comprising:

inputting the data in the DSSAT parameter adjustment database obtained in the step S1 into the rice growth model, continuously adjusting the genetic coefficient of the model to approach to a measured value through DSSAT-GLUE (Decision Support System for Agrotechnology Transfer-Generalized Likelihood Uncertainty Estimation) and trial-and-error methods; wherein genetic parameters are localized genetic parameters, and the rice growth model is a localized model;

step S4.2: using the regional analysis tool to extract raster values of the plot-level aboveground biomass and plant nitrogen concentration estimation layers of each remote sensing source obtained in the step S3.3 to obtain an estimated aboveground biomass and plant nitrogen concentration values of each remote sensing source in each plot, calculate $PNU_{difference}$ in each remote sensing source each plot, the difference in plants nitrogen absorbing amount in each source each plot is $PNU_{difference}$, and the plot-level aboveground biomass estimate of each remote sensing source is input into the localized rice growth model obtained in the step S4.1, to obtain plot-level target yield and total recommended nitrogen application rate at middle stage of rice growth of each remote sensing source;

wherein the plants nitrogen absorbing amount is calculated, as follows:

$$PNU = N_a \times AGB;$$

wherein the plants critical nitrogen absorbing amount is calculated according to:

$$PNU_C = N_c \times AGB;$$

wherein the difference in plants nitrogen absorbing amount is calculated, as follows:

$$PNU_{difference} = PNU - PNU_C;$$

wherein PNU is the plants nitrogen absorbing amount, whose unit is kg ha$^{-1}$; $PNU_C$ is the plants critical nitrogen absorbing amount, whose unit is kg ha$^{-1}$; $PNU_{difference}$ is the difference in plants nitrogen absorbing amount, whose unit is kg ha$^{-1}$; AGB is the aboveground biomass, whose unit is t ha$^{-1}$; $N_c$ is the critical nitrogen concentration, whose unit is g kg$^{-1}$; $N_a$ is the plant nitrogen concentration, whose unit is g kg$^{-1}$;

step S4.3: combining the plot-level target yield and total recommended nitrogen application amount of each remote sensing source obtained in the step S4.2, and the nitrogen application amount data of each plot before panicle fertilizer in the target year, calculate the recommended nitrogen amount of panicle fertilizer in each plot of each remote sensing source, and finally obtaining recommendations of panicle fertilizer nitrogen at the plots-level of each remote sensing source;

the recommended amount of nitrogen fertilizer for each plot=(total recommended nitrogen application amount−nitrogen application amount before panicle fertilizer)−$PNU_{difference}$/nitrogen recovery rate of panicle fertilizer.

2. The method for recommending rice panicle fertilizer nitrogen based on crop models and remote sensing coupling according to claim 1, wherein the vegetation index includes green difference vegetation index, green normalized difference vegetation index, green wide dynamic range vegetation index, green chlorophyll index, modified green simple ratio index, green soil adjusted vegetation index, modified green soil adjusted vegetation index, green optimized soil adjusted vegetation index, green renormalized difference vegetation index, normalized difference vegetation index, ratio vegetation index, optimized soil adjusted vegetation index, wide dynamic range vegetation index, soil adjusted vegetation index, modified soil adjusted vegetation index, difference vegetation index, renormalized difference vegetation index, transformed normalized vegetation index, optimized vegetation index, MERIS vegetation index, red edge difference vegetation index, normalized difference red edge vegetation index, red edge optimized soil adjusted vegetation index, red edge difference vegetation index, red edge normalized difference vegetation index, red edge green ratio vegetation index, red edge green difference vegetation index, red edge green normalized vegetation index, MERIS chlorophyll index, normalized green index, normalized red edge index, normalized near infrared index, modified double difference index, modified enhanced vegetation index, modified normalized difference red edge index, modified chlorophyll absorption in reflectance index 1, modified chlorophyll absorption in reflectance index 2, modified transformed chlorophyll absorption in reflectance index, and modified canopy chlorophyll content index.

3. The method for recommending rice panicle fertilizer nitrogen based on crop models and remote sensing coupling according to claim 1, wherein said DSSAT parameter adjustment database includes at least 3 years of nitrogen fertilizer gradient test data, weather data, plots-scale soil data, rice variety information and management data in the rice planting area; said weather data includes daily maximum temperature, daily minimum temperature, daily sunshine hours, daily precipitation, humidity, wind direction and cloud thickness; said soil data includes soil pH, soil organic matter, soil total nitrogen, soil available phosphorus, soil available potassium, soil bulk density, soil texture, soil moisture, soil cation exchange capacity, soil nitrate nitrogen and soil ammonium nitrogen; said nitrogen fertilizer gradient test data includes the flowering period, maturity period time, and yield of rice under different nitrogen fertilizer dosage gradients, as well as the aboveground biomass, leaf area index, grain weight and chlorophyll content under different nitrogen fertilizer dosage gradients and during the key growth period of rice; wherein, said nitrogen fertilizer gradient is: no nitrogen application, 50% of the local recommended nitrogen application, 100% of local recommended nitrogen application and 150% of the local recommended nitrogen application, recorded as N0, N1, N2, N3 respectively;

said key growth periods of rice are: tillering stage, panicle initiation stage, stem elongation stage, heading stage, 20 days after heading and maturity stage; said management data includes plots information, agricultural operation information, fertilization information and environmental information.

4. The method for recommending rice panicle fertilizer nitrogen based on crop model and remote sensing coupling according to claim 1, wherein, in the step S2.2, the aboveground biomass and plant nitrogen concentration are independent variables, and the vegetation index is the dependent variable.

5. The method for recommending rice panicle fertilizer nitrogen based on the crop models and remote sensing coupling according to claim 1, wherein, in the step S2.2, the model evaluation indicators include coefficient of determination, mean absolute error and root mean square error, based on the principle that the larger the coefficient of determination is, the smaller the mean absolute error and root mean square error are, the optimal model is screened;

wherein the coefficient of determination is calculated, as follows:

$$R^2 = \frac{\sum(y_i - \bar{y})^2}{\sum(x_i - \bar{y})^2};$$

wherein the root mean square error is calculated, as follows:

$$RMSE = \sqrt{\frac{1}{n}\sum_{i=1}^{n}(x_i - y_i)^2};$$

wherein the mean absolute error is calculated, as follows:

$$MAE = \frac{1}{n}\sum_{i=1}^{n}|y_i - x_i|;$$

wherein $R^2$ is the coefficient of determination; MAE is the mean absolute error; RMSE is the root mean square error; $y_i$ is the model prediction value; $x_i$ is the measured value; $\bar{y}$ is the average of the measured value; n is the amount of samples participating in calculation.

6. The method for recommending rice panicle fertilizer nitrogen based on the crop models and remote sensing coupling according to claim 1, wherein, in the step S4.1, use the agronomic parameters of aboveground biomass, leaf area index, grain weight and chlorophyll content that predicted by the model after adjusting the genetic parameters, used the coefficient of determination, normalized root mean square error and average error between the agronomic parameters and the measured values as evaluation indicators, the model is completed until coefficient of determination reaches more than 85% and normalized root mean square error is less than 15%, adjust parameters to achieve model localization, in which the average error E<0 or E>0 is used to judge whether the model underestimates or overestimates the above agronomic parameters; genetic parameters are localized genetic parameters, and the rice growth model is a localized model;

wherein the average error is calculated, as follows:

$$E = \sum(y_i - x_i)/n;$$

wherein the coefficient of determination is calculated, as follows:

$$R^2 = \frac{\sum(y_i - \bar{y})^2}{\sum(x_i - \bar{y})^2};$$

wherein the normalized root mean square error is calculated, as follows:

$$nRMSE = 100 \times \frac{\sqrt{(1/n)\sum(y_i - x_i)^2}}{\sum x_i/n};$$

wherein E is the average error; $R^2$ is the coefficient of determination; nRMSE is the normalized root mean square error; yi is the model prediction value; xi is the measured value; $\bar{y}$ is the average of the measured value; n is the amount of samples participating in the calculation.

* * * * *